United States Patent
Bayya et al.

(10) Patent No.: US 8,658,083 B2
(45) Date of Patent: Feb. 25, 2014

(54) SPINEL-GERMANATE GLASS COMPOSITE AS AN IR WINDOW

(75) Inventors: Shyam S. Bayya, Ashburn, VA (US); Jasbinder S. Sanghera, Ashburn, VA (US); Guillermo R. Villalobos, Springfield, VA (US); Ishwar D. Aggarwal, Charlotte, NC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 11 days.

(21) Appl. No.: 13/533,227

(22) Filed: Jun. 26, 2012

(65) Prior Publication Data

US 2013/0065746 A1    Mar. 14, 2013

(51) Int. Cl.
C04B 41/50 (2006.01)

(52) U.S. Cl.
CPC ............... *C04B 41/5046* (2013.01)
USPC ....................................... 264/604

(58) Field of Classification Search
CPC .................................. C04B 35/443
USPC ....................................... 264/604
See application file for complete search history.

(56) References Cited

U.S. PATENT DOCUMENTS

| | | | |
|---|---|---|---|
| 5,244,849 A * | 9/1993 | Roy et al. | 501/120 |
| 5,305,414 A | 4/1994 | Higby et al. | |
| 5,486,495 A | 1/1996 | Jewell et al. | |
| 5,786,287 A * | 7/1998 | Bayya et al. | 501/10 |
| 7,670,685 B2 * | 3/2010 | Bayya et al. | 428/432 |
| 7,927,705 B2 * | 4/2011 | Bayya et al. | 428/426 |
| 8,266,924 B2 * | 9/2012 | Bayya et al. | 65/37 |
| 2006/0093738 A1 * | 5/2006 | Lin et al. | 427/190 |
| 2006/0093834 A1 * | 5/2006 | Lin et al. | 428/432 |
| 2007/0087204 A1 * | 4/2007 | Bayya et al. | 428/432 |
| 2009/0220790 A1 | 9/2009 | Kim et al. | |
| 2010/0126219 A1 * | 5/2010 | Bayya et al. | 65/32.1 |
| 2013/0160492 A1 * | 6/2013 | Villalobos et al. | 65/17.3 |

* cited by examiner

*Primary Examiner* — Joseph S Del Sole
*Assistant Examiner* — Russell Kemmerle, III
(74) *Attorney, Agent, or Firm* — US Naval Research Laboratory; Stephen T. Hunnius

(57) ABSTRACT

This disclosure involves a new spinel and glass micro-composite material and process for making such. The composite has excellent transmission in the 0.5-5.0 μm wavelength region suitable for various visible and mid IR applications utilizing windows, domes and other geometric shapes. The composite can be made at a temperature about 40% lower than the glass melting temperature and about 50% lower than the spinel sintering temperature. The composite material has high modulus and fracture toughness which are important for impact resistance in armor and other practical applications.

8 Claims, 5 Drawing Sheets

SPINEL-GERMANATE GLASS COMPOSITE AS AN IR WINDOW

This application claims priority to and benefit of U.S. Patent Application No. 61/532,321 filed Sep. 8, 2011, the entirety of which is herein incorporated by reference.

BACKGROUND

This disclosure involves a new spinel and glass micro-composite material and process for making such.

BRIEF SUMMARY OF THE INVENTION

This new spinel and glass micro-composite material has excellent transmission in the 0.5-5.0 μm wavelength region suitable for various visible and mid IR applications utilizing windows, domes and other geometric shapes (IRCM jam heads, vis-IR windows, transparent armors, etc).

The composite is made at a temperature about 40% lower than the glass melting temperature and about 50% lower than the spinel sintering temperature.

The composite material has high modulus and fracture toughness which are important for impact resistance in armor and other practical applications.

Herein is disclosed a new product which is a magnesium aluminate spinel-germanate glass micro-composite where spinel particles are uniformly dispersed in a germanate glass matrix and also where the refractive indices of spinel and germanate glass are exactly matched.

The spinel transmits from 0.2 to 5 μm. Due to this index match, there is no scattering loss from the two-phase composite and the size of the spinel particle can be large to significantly contribute to the enhanced crack deflection mechanism.

DETAILED DESCRIPTION

Figure 1:
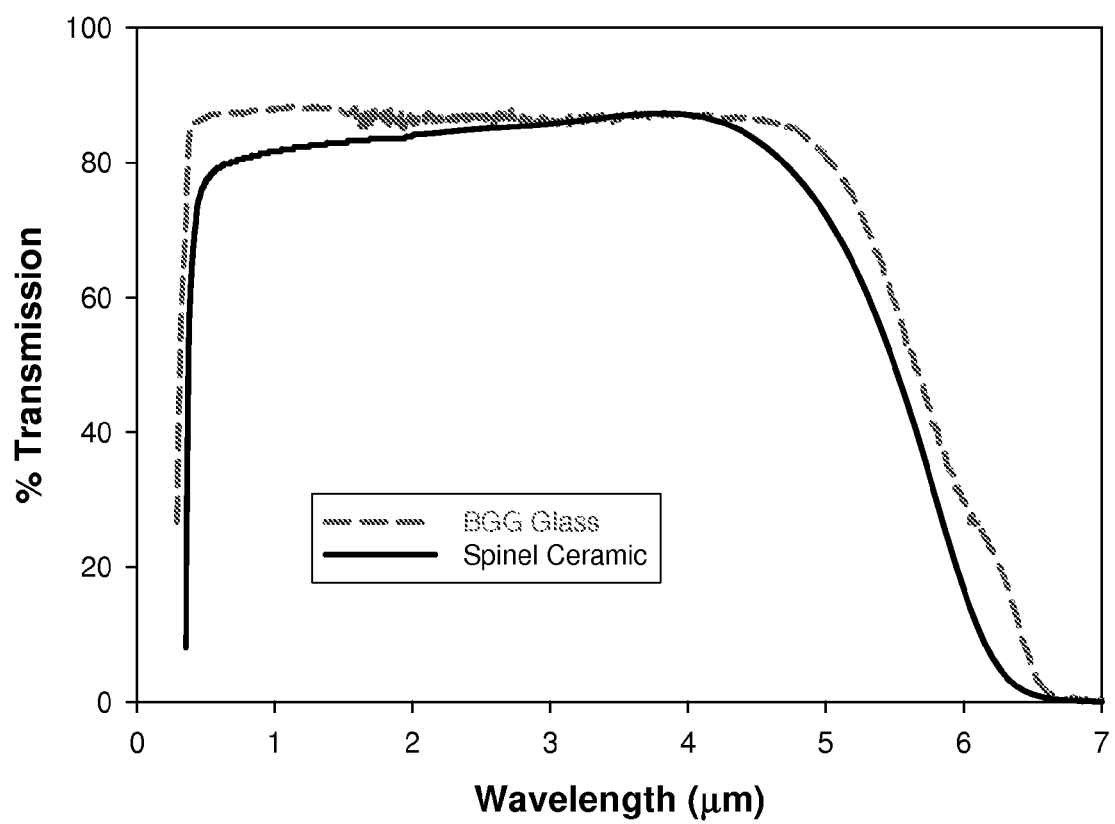
FIG. 1 illustrates transmission window for BGG glass and spinel ceramic in the visible and IR range.

This disclosure involves a new spinel and glass micro-composite material and process for making such.

This new spinel and glass micro-composite material has excellent transmission in the 0.5-5.0 μm wavelength region suitable for various visible and mid IR applications utilizing windows, domes and other geometric shapes (IRCM jam heads, vis-IR windows, transparent armors, etc).

The composite is made at a temperature about 40% lower than the glass melting temperature and about 50% lower than the spinel sintering temperature.

The composite material has high modulus and fracture toughness which are important for impact resistance in armor and other practical applications.

There are numerous sensor and other systems operating in the vis-IR (0.5-5.0 μm) wavelength band, which require windows/domes for protection. The size, shape, and desired properties of the windows depend on the application.

These applications can be very military specific, such as sensor windows and domes on aircrafts, reconnaissance windows on military aircrafts and Unmanned Aerial Vehicles (UAV) and windows on HMMWVs.

On the other hand, the applications can be commercial, such as windshields and windows on armored vehicles, banks and other facilities of interest requiring ballistic protection while maintaining window transparency.

NRL has developed a vis-IR transmitting germanate glass (U.S. Pat. No. 5,305,414). This glass can be made in large sizes and shapes by glass melting at temperatures of about 1300° C.-1400° C. followed by casting in the desired size and shape to make a transparent product.

Inherently the glass can be weak due to a low modulus and lack of crack deflection or arrest mechanisms.

To overcome these shortcomings germanate glass ceramic was developed which was covered under U.S. Pat. Nos. 5,486,495 and 5,786,287. The glass ceramic is obtained by first making the glass article from high temperature processing followed by reheating near the crystallization temperatures (typically about 750° C.-850° C. for germanate glasses covered in the earlier patents). This heat treatment causes crystals to form within the glass matrix. These crystals provide the crack deflection mechanism and strengthen the material.

The drawback of this approach for strengthening is the mismatch in the refractive index of the crystalline phase and the remnant glass. This index difference causes scattering loss and results in reduced transmission. This scattering loss can be minimized by restricting the crystal size to about $1/10^{th}$ the wavelength of light (or in 50 nm-100 nm scale). This can be difficult to achieve.

To achieve smaller crystals, the glass is heat treated at lower temperatures where the crystals do not grow to large sizes. The crystalline phase typically has a slightly higher modulus and strength than the amorphous phase. As a result, when the glass ceramic with nano-scale crystals is fractured, it behaves more glass-like where the cracks either go through the crystals or go around the fine crystal boundaries without much of a tortuous path.

It would be better if the crystal phase had a much higher modulus and strength. Unfortunately, this is not possible in the germanate glasses described in the prior art, since thermodynamically only the lower modulus phase can grow.

Herein is disclosed a new product which is a magnesium aluminate spinel-germanate glass micro-composite where spinel particles are uniformly dispersed in a germanate glass matrix and also where the refractive indices of spinel and germanate glass are exactly matched.

The spinel transmits from 0.2 to 5 μm. Due to this index match, there is no scattering loss from the two-phase composite and the size of the spinel particle can be large to significantly contribute to the enhanced crack deflection mechanism.

Since the modulus and hardness of spinel is much higher than that of the germanate glass or germanate glass ceramic, then the crack in the composite does not go through the spinel phase, rather it goes around in a tortuous path.

This significantly increases the fracture toughness (resistance to crack growth) of the material.

The modulus and hardness of spinel, germanate glass and germanate glass ceramic are shown in Table 1.

TABLE 1

Property comparison between BGG glass and spinel ceramic

| | Hardness (Kg/mm$^2$) | Elastic Modulus (GPa) | Refractive Index at 633 nm | CTE in 50-150° C. range ($\times 10^{-6}$ in/in/° C.) |
|---|---|---|---|---|
| BGG Glass | 560 | 69 | 1.720 | 6.36 |
| Spinel | 1645 | 282 | 1.725 | 6.34 |

The composite can be designed in such a way that the coefficient of thermal expansion (CTE) of the spinel and the germanate glass exactly match in operating temperatures of 50° C. to 150° C. This will ensure that when the composite is heated or cooled during usage, it does not create any thermal stresses in the material.

This spinel-germanate glass micro-composite is very strong and has high impact resistance making it very suitable for transparent armor applications.

The closely matched refractive indices make the composite transparent in the visible and mid-wave infrared for several sensor dome and window applications.

The transmission window of spinel ceramic and germanate glass are shown in FIG. 1. Both these materials transmit very well in the visible, near IR and mid IR covering the 0.4-5.0 μm wavelength region. So not only do they transmit in the 0.4-2 μm region, they also transmit in the 2 to 5 μm region.

The germanate glass of this invention has a nominal molar composition of 15BaO-15Ga$_2$O$_3$-70GeO$_2$.

Figure 2:
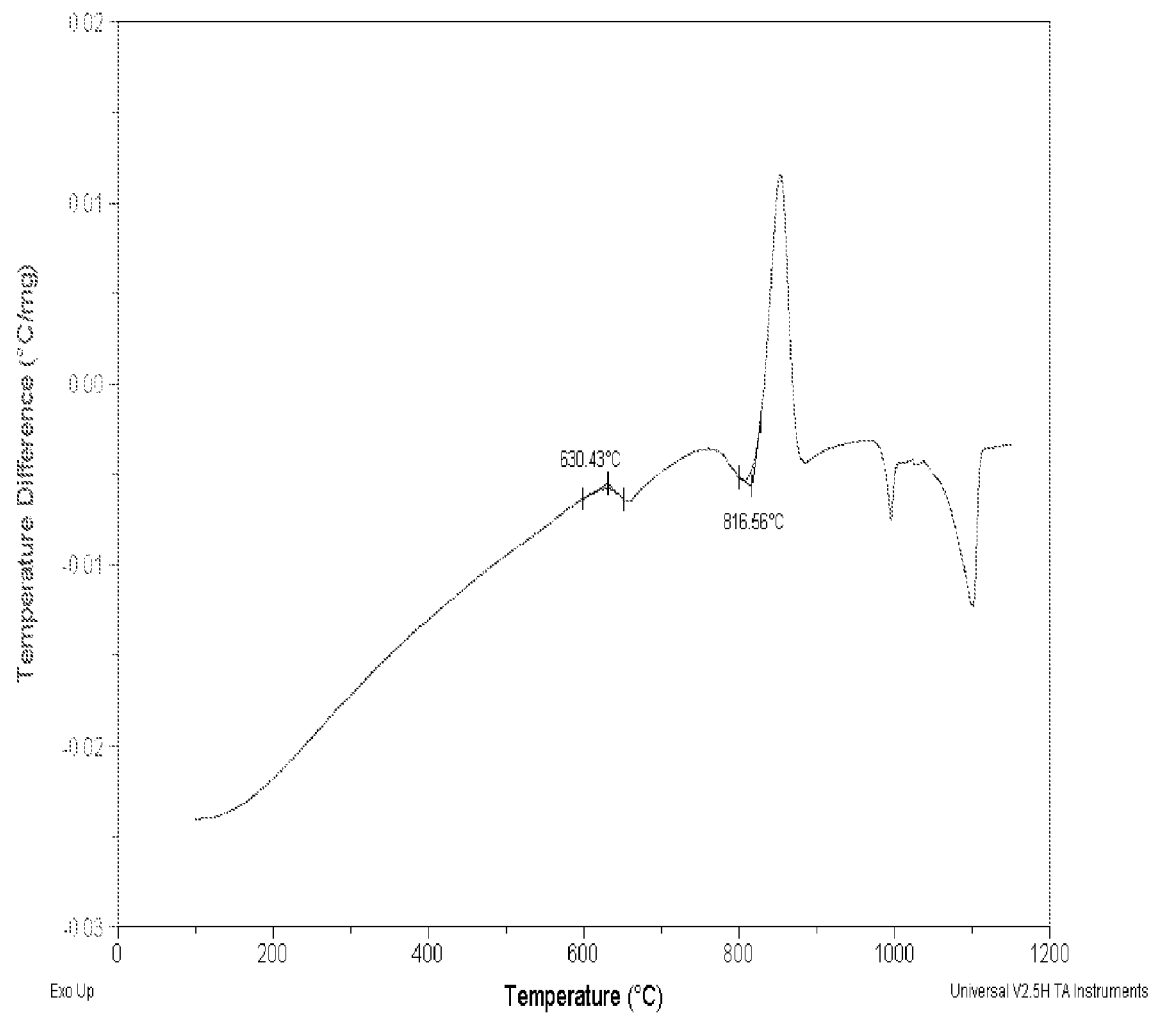
FIG. 2 illustrates DTA trace of the glass of this invention showing $T_g=630°$ C., $T_x=816°$ C. and a glass stability $T_x-T_g$ of 186° C.

FIG. 2 shows the differential thermal analysis (DTA) plot of the glass highlighting its glass transition temperature (T$_g$) and the crystallization temperature (T$_x$). This glass has a T$_g$ of 630° C. and a T$_x$ of 816° C. The composition is very stable as seen from its large (T$_x$-T$_g$). This indicates that the glass can be easily made in large sizes and complex shapes.

The glass is melted in a platinum crucible in the temperature range of 1300° C.-1350° C. The glass is powdered and sieved through 325 and 400 size mesh to collect glass powder particles in the range of 37-44 μm.

In one embodiment, spinel powder synthesized at NRL as disclosed in U.S. patent application Ser. No. 12/362,430 was used in making the composite. Sometimes the spinel powder from commercial vendors has coral reef-like structure and so the glass cannot easily transport in to fill the voids to make a transparent ceramic.

To overcome such instances in another embodiment, the spinel powder was sintered at high temperature to form well defined grains. These grains were then powdered and sieved through 325 and 400 size mesh to collect spinel powders of particle size 37-44 μm.

The germanate glass powder and spinel powder are mixed to contain 0 to 40% volume fraction of spinel. Uniform mixing is achieved by using one of the powder mixing techniques such as agate/motor, ball mill, vibro-milling or other conventional techniques. Mixed powder is loaded in the die and hot pressed in the temperature range of 650° C. to 800° C. and pressure in the range of 1,000 to 10,000 psi. The hot press time varied from 30 minutes to 6 hours. The sample can be annealed in the hot press during the cool down cycle at the glass transition temperature of the germanate glass followed by slow cooling to room temperature.

The hot pressed spinel-germanate glass micro-composite sample can then be polished to the desired shape and size. Also, it can be made near net shape using a suitable die and mold. The transmission measurements performed on the polished sample demonstrated very low scattering loss. Elastic modulus measurements demonstrated significant increase over the base glass.

This micro-composite can be laminated with polycarbonate or other suitable material (or materials) to make a ballistic window. Because of high strength and modulus of the composite, a thinner and lighter ballistic window would be needed compared to a ballistic glass with equivalent ballistic protection.

This process can be used to make unique functional materials. One such example is a low CTE ceramic-glass composite which contains a negative CTE Zirconium Tungstate (ZrW$_2$O$_8$) phase and a positive CTE germanate glass to make a low CTE glass-ceramic. Another example is a rare-earth doped glass ceramic where the rare earth is in the crystalline phase. In a glass ceramic where the crystals are grown out of a glass matrix, getting the right crystalline phase to come out of the glass matrix in the right size so that it doesn't scatter light and high enough volume fraction to make the glass ceramic functional is a challenge. Alternatively, the desired crystalline phase particles in the desired size can be mixed with the glass phase and hot pressed near the glass softening temperature to make a transparent material.

This invention is described further with the help of the following examples:

Example 1

This example details fabrication of the glass of this invention. A 200 grams batch of the 15BaO-15Ga$_2$O$_3$-70GeO$_2$ glass was prepared by mixing 45.22 grams of BaCO$_3$, 42.94 grams of Ga$_2$O$_3$ and 111.84 grams of GeO$_2$. The glass batch was mixed for 30 minutes. The batch was then transferred to a platinum crucible. The platinum crucible containing the batch material was placed in a pre-melting furnace preheated to 1350° C. The batch material was left in the furnace to melt for 10 minutes and quenched in air to make cullet. The cullet was then transferred to another crucible that was loaded in a sealed atmosphere controlled furnace. The furnace was flushed with dry argon for 1 hour to remove moist air. The furnace was then heated to 1300° C. under Ar/O$_2$ atmosphere. The glass was bubbled with Ar/O$_2$ mixture (mixed in 80:20 ratio) for 9 hours. After 9 hours of bubbling the bubbling tube was pulled out of the melt with the O$_2$/Ar gasses still flowing over the melt. The melt was left at 1300° C. for another 30 minutes to fine and was then quenched in the sealed furnace and allowed to cool to room temperature. The cooled glass was crushed, ground and sieved through 325 and 400 size mesh to collect glass powder in the size range of 37-44 μm.

Commercially available spinel powder (Baikowski International, Corp.) was ball milled and sieved through 325 and 400 size mesh to collect powder in the size range of 37-44 μm. The BGG glass powder and the spinel powder were mixed in 100:0, 90:10, 80:20, 70:30 and 60:40 volume ratios, respectively. The mixed powders were hot pressed in a graphite die in the temperature range of 700-780 C for 2 hour at 1500 psi pressure. The hot pressed samples were hazy in the visible and clear in the IR region. The haze is attributed to the trapped porosity in the hot pressed samples originating from the coral reef like structure of spinel powder where the glass could not diffuse completely into the voids.

Example 2

This example details the use of 5 mole % BaCl$_2$ in the batch to dry the glass during melting. A 200 grams batch of the 10BaO-5BaCl$_2$-15Ga$_2$O$_3$-70GeO$_2$ glass was prepared by mixing 30.02 grams of $BaCO_3$, 15.84 grams of $BaCl_2$, 42.77 grams of $Ga_2O_3$ and 111.37 grams of $GeO_2$. The rest of the processing was similar to that described in Example 1.

Example 3

This example is similar to Example 2 with the difference being the use of NRL synthesized spinel nano-powder obtained using the process disclosed in U.S. patent application Ser. No. 12/362,430. The hot pressed samples obtained, using this spinel powder, were transparent in the visible and in the infrared region.

Example 4

Figure 3:
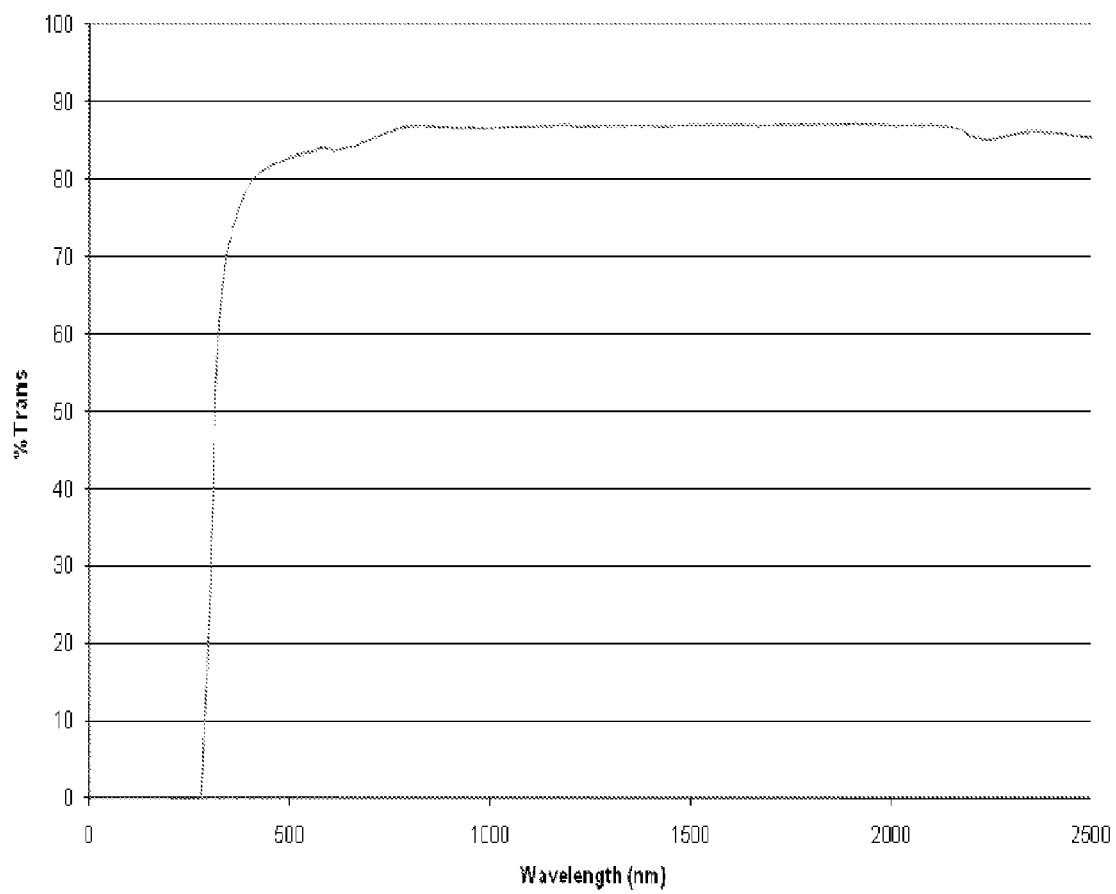
FIG. 3 illustrates Visible and Near-IR transmission through a hot-pressed BGG glass-spinel composite.
Figure 4:
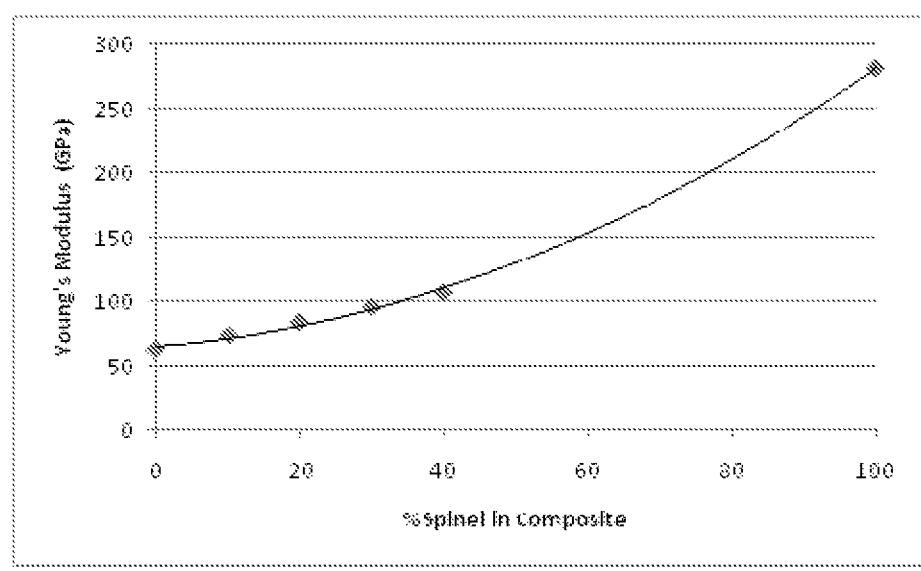
FIG. 4 illustrates increase in Young's modulus of composite as a function of spinel volume fraction. (Line is drawn as a guide to eye.)
Figure 5:
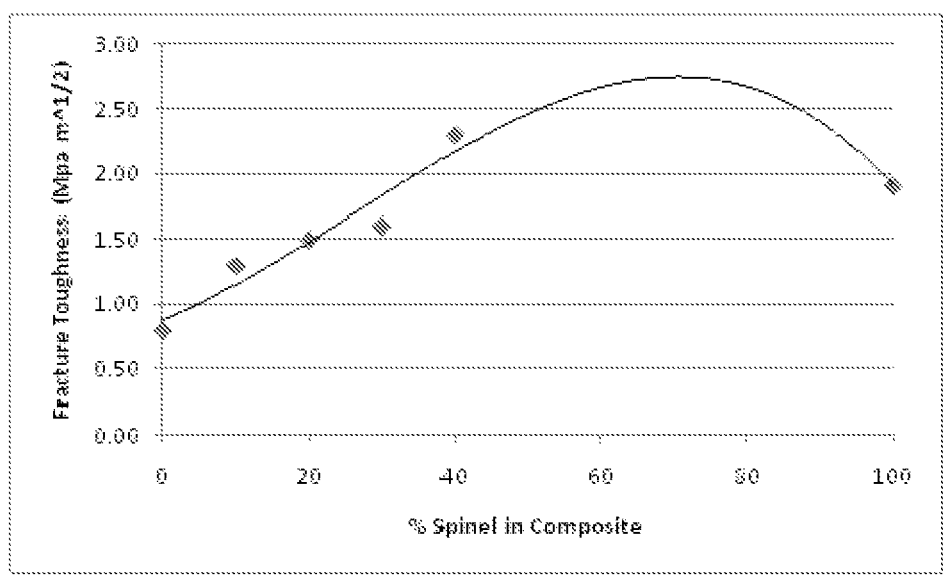
FIG. 5 illustrates increase in fracture toughness of composite as a function of spinel volume fraction. (Line is drawn as a guide to eye.)

This example is similar to Example 2 with the difference in the source of spinel powder used. The commercially available spinel powder was first hot pressed into a transparent ceramic to fully convert spinel particles into grains. The transparent spinel ceramic was crushed and ground into powder. The spinel powder thus obtained was sieved through 325 and 400 size mesh to collect powder with particle size between 37 and 44 μm. This powder was mixed with the BGG glass powder in ratios described in Example 1 and hot pressed to obtain 2" diameter 5 mm thick dense composites. These samples were clear and transparent in the visible and IR region and did not exhibit any noticeable scattering loss. The visible and near IR transmission through one of the samples is shown in FIG. 3. Properties of the hot pressed samples measured include Young's modulus, Shear modulus, Poisson's ratio, hardness, fracture toughness and density and the results are reported in Table 2. All the mechanical properties improved with increasing spinel volume fraction in the composite. The most significant improvement was in fracture toughness where the value increased by 200% for 40 volume % of spinel phase in the composite. The increase in Young's modulus and fracture toughness are shown in FIGS. 4 & 5.

TABLE 2

Mechanical properties of BGG glass—spinel ceramic hot pressed composite. The % in the specimen number represents the volume % of spinel added to the BGG glass in the composite.

| Specime Number | Young's Modulu (GPa) | Shear Modulu (GPa) | Poisson' Ratio | Vicker's Hardnes $Kg/mm^2$ | Fracture Toughness $MPa.m^{1/2}$ | Density (g/cc) |
|---|---|---|---|---|---|---|
| BHP 31 0% | 62.1 | 24.2 | 0.28 | 401 | 0.76 | 4.41 |
| BHP 32 10% | 73.0 | 28.6 | 0.28 | 426 | 1.34 | 4.31 |
| BHP 35 20% | 83.4 | 32.8 | 0.27 | 431 | 1.54 | 4.22 |
| BHP 36 30% | 95.0 | 37.3 | 0.27 | 459 | 1.62 | 4.09 |
| BHP 40 40% | 106.0 | 41.7 | 0.27 | 549 | 2.27 | 3.96 |
| 100% spinel | 282 | 107 | 0.26 | 1645 | 1.9 | 3.58 |

Herein disclosed is a new glass-ceramic composite material that has many novel features including but not limited to: 1) Visible and IR transmission 2) Processed near glass softening temperature 3) Higher modulus than the glass 4) A composite structure with dispersed hard spinel phase in a glass matrix providing a mechanism for crack deflection and branching resulting into a high performance composite and 5) Such composite will enable rugged and strong windows and transparent armors at lower cost, and potentially thinner sizes and lower weight than conventional ceramic materials.

Applications of the glass and the composite materials discussed here do not have to be limited to military platforms. These materials can also find commercial applications such as windshields and windows on armored vehicles, banks and other facilities of interest requiring ballistic protection while maintaining window transparency.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What we claim is:

1. A method of making spinel-germanate glass composite comprising:
   melting a germanate glass in a crucible in the temperature range of about 1300° C.-1350° C.;
   powdering and sieving the germanate glass through 325 and 400 size mesh;
   collecting the germanate glass powders in the range of 37-44 μm;
   sintering a spinel powder to form spinel powders;
   powdering and sieving the spinel powders through 325 and 400 size mesh;
   collecting the spinel powders of particle size about 37-44 μm;
   mixing the germanate glass powders and the spinel powders so that the resulting mixed powders contain 0.0001 to 40% volume fraction of the spinel powders;
   loading the mixed powders in a die;
   hot pressing the mixed powders in the die in the temperature range of about 650° C. to 800° C. and pressure in the range of about 1,000 to 10,000 psi for about 30 minutes to about 6 hours; and
   cooling the mixed powders to form a spinel-germanate glass composite.

2. The method of claim 1 wherein uniform mixing is achieved by using a powder mixing technique such as agate/motor, ball mill, or vibro-milling.

3. The method of claim 1 further including annealing in the hot press during cooling at the glass transition temperature of the germanate glass followed by cooling to room temperature.

4. The method of claim 1 further including polishing the spinel-germanate glass composite.

5. The method of claim 4 further including laminating the spinel-germanate glass composite.

6. The method of claim 5 wherein said laminate is polycarbonate.

7. A method of making spinel-germanate glass composite comprising:
   preparing a $15BaO-15Ga_2O_3-70GeO_2$ glass batch;
   mixing the glass batch for about 30 minutes;
   transferring the glass batch to a platinum crucible;
   placing the platinum crucible containing the glass batch in a pre-melting furnace preheated to 1350° C.;
   allowing the glass batch to melt;
   quenching in air to make a cullet;
   transferring the cullet to another crucible that was loaded in a sealed atmosphere controlled furnace;
   flushing the furnace with dry argon for about 1 hour to remove moist air;
   heating the furnace to about 1300° C. under $Ar/O_2$ atmosphere;
   bubbling the glass batch using a bubbling tube with $Ar/O_2$ mixture mixed in 80:20 ratio for about 9 hours;
   removing the bubbling tube;
   maintaining the temperature of about 1300° C. for another about 30 minutes with the $O_2/Ar$ gasses still flowing;
   quenching in the sealed furnace and cooling to room temperature;
   crushing, grounding and sieving through 325 and 400 size mesh to collect glass powder in the size range of 37-44 µm;
   milling and sieving spinel powder through 325 and 400 size mesh to collect powder in the size range of 37-44 µm;
   mixing the glass batch and the spinel powder; and
   hot pressing in a graphite die in the temperature range of about 700-780 C for about 2 hours at about 1500 psi pressure.

8. The method of claim 7 wherein the step of mixing the glass batch and the spinel powder results in a volume ratio of one selected from the group consisting of 99.9999:0.0001, 90:10, 80:20, 70:30 and 60:40.

\* \* \* \* \*